United States Patent
Brooks et al.

[11] Patent Number: 6,151,615
[45] Date of Patent: Nov. 21, 2000

[54] METHOD AND APPARATUS FOR FORMATTING AN INTERMEDIATE RESULT FOR PARALLEL NORMALIZATION AND ROUNDING TECHNIQUE FOR FLOATING POINT ARITHMETIC OPERATIONS

[75] Inventors: Jeffrey S. Brooks, Round Rock; James S. Blomgren, Austin, both of Tex.

[73] Assignee: Intrinsity, Inc., Austin, Tex.

[21] Appl. No.: 09/120,776

[22] Filed: Jul. 22, 1998

Related U.S. Application Data

[60] Provisional application No. 60/057,322, Sep. 2, 1997.
[51] Int. Cl.[7] ........................................... G06F 7/38
[52] U.S. Cl. ............................................... 708/497
[58] Field of Search ................... 708/496–497, 708/205

[56] References Cited

U.S. PATENT DOCUMENTS

| | | |
|---|---|---|
| 4,926,370 | 5/1990 | Brown et al. . |
| 4,941,120 | 7/1990 | Brown et al. . |
| 5,258,943 | 11/1993 | Gamez et al. ........................... 708/497 |
| 5,303,175 | 4/1994 | Suzuki ..................................... 708/497 |
| 5,568,412 | 10/1996 | Han et al. ............................... 708/497 |
| 5,696,711 | 12/1997 | Makineni ................................ 708/497 |
| 5,781,464 | 7/1998 | Mehta ..................................... 708/496 |

*Primary Examiner*—Tan V. Mai
*Attorney, Agent, or Firm*—Booth & Wright, L.L.P.; Matthew J. Booth; Karen S. Wright

[57] ABSTRACT

The present invention describes an apparatus and method that formats the output fraction result of an ANSI/IEEE 754-1985 floating point arithmetic operation where parallel normalization and rounding of the intermediate fraction result has occurred. The output fraction is formatted using all or some of the bits from the output of either the rounder circuit or the normalizer circuit.

20 Claims, 6 Drawing Sheets

METHOD AND APPARATUS FOR FORMATTING AN INTERMEDIATE RESULT FOR PARALLEL NORMALIZATION AND ROUNDING TECHNIQUE FOR FLOATING POINT ARITHMETIC OPERATIONS

This application claims the benefits of the earlier filed U.S. Provisional Application Ser. No. 60/057,322, filed Sep. 2, 1997, which is incorporated by reference for all purposes into this application.

BACKGROUND OF THE INVENTION

1. Field of the Invention

The present invention relates to performing certain floating point arithmetic operations in a processor. More particularly, the invention relates to simplifying the completion of floating point arithmetic operations on two pre-normalized operands by performing in parallel the steps of normalizing and rounding the arithmetic result.

2. Description of the Related Art

Within a processor, a given number may be stored in a format known as floating point. The operations of multiply, divide, add, and subtract may be performed on floating point numbers. An American national standard has been developed in order to provide a uniform system of rules for governing the implementation of floating point arithmetic systems. This standard is identified as ANSI/IEEE Standard No. 754-1985, and is incorporated by reference in this application. In the design of floating point arithmetic systems and algorithms, it is a principal objective to achieve results that are consistent with this standard and enable users of such systems and algorithms to achieve conformity in the calculations and solutions to problems even though the problems are solved using different computer systems.

The typical floating point arithmetic operation may be accomplished in single precision, double precision, or extended precision format. Each of these formats utilizes a sign, exponent, and fraction field, where the respective fields occupy predefined portions of the floating point number. In addition, the extended precision format includes a mantissa field, which includes the fraction field plus an additional bit, the L bit, that is merely implied in the single—and double-precision formats.

FIG. 1 illustrates the IEEE format for a 32-bit single precision number where the sign field is a single bit occupying the most significant bit position; the exponent field is an 8-bit quantity occupying the next-most significant bit positions; and the fraction field occupies the least significant 23 bit positions. In the case of a double precision floating point number, the sign field is a single bit occupying the most significant bit position; the exponent field is an 11-bit field occupying the next-most significant bit positions; and the fraction field is a 52-bit field occupying the least significant position. The format of the extended precision floating point number requires a single sign bit, a 15 bit exponent field, and a 64-bit mantissa field that includes the fraction and the L bit.

In designing the hardware and logic for performing floating point arithmetic operations in conformance with the ANSI/IEEE standard 754-1985, it is necessary to incorporate certain additional indicator bits into the floating point hardware operations. For example, an "implicit" bit I is created by control logic when the exponent of the floating point number has a nonzero value. This bit, also called the "L" bit, can be created at the time a floating point number is written into the arithmetic registers where the implicit bit occupies the first bit position to the left of the fraction field of the number. Since, for non-zero exponents, the L bit is always one, it is "implied" and is not explicitly represented in the IEEE representation for single and double precision floating point numbers.

The L bit is represented internally within the floating point unit of the processor. The L bit is included, along with the fraction, in the mantissa of the internal representation of floating point numbers. While the L bit is only implied for IEEE single—and double-precision formats, the L bit explicitly is represented in registers containing extended precision floating point numbers.

An additional indicator bit, a "guard" bit G, is set by the floating point logic during certain arithmetic operations as an indicator of the loss of precision of the floating point number being processed. In the case of addition and subtraction, the G bit is set when a right shift, required for alignment, shifts a significant bit off the right side of the register capacity.

Additional indicator bits, a "round" bit R and a "carry" bit C, are similarly used for certain floating point operations and are set by the floating point logic. Finally, a "sticky" bit S is an indicator bit that is set in certain floating point arithmetic operations when any lower precision bit is a "1" as an indicator that the floating point number has lost some precision. In the standard prior art systems, the G, R and S bits are used exclusively for rounding operations, after the result has been normalized. The G and R bits are treated as if they are a part of the fraction; they are shifted with the rest of the fraction, and included in all arithmetic operations. The S bit is not shifted with the fraction but is included in the arithmetic. It acts as a "catcher" for 1's shifted off the right of the fraction. When a 1 is shifted off the right side of the fraction, the S bit will remain set until normalization and rounding are finished.

Floating point arithmetic operations require round logic well-known in the art to create a round control bit or signal indicating whether or not rounding is required. If none of the G, R, and S bits are set to a binary "1", no rounding will be required and the round control bit will not be set. Otherwise, the round control bit will be set or reset as required by the full set of round logic inputs.

After each floating point intermediate arithmetic result is developed, it must be normalized and then rounded if the round control bit is set. In the prior art, floating point units generally perform normalization and rounding functions in series. First the fraction portion of the unnormalized intermediate result of a floating point arithmetic operation is passed to a normalizer circuit where normalization is performed. Then, after normalization, rounding is performed.

In the prior art, normalization refers to the process of manipulating the exponent and fraction of an unnormalized intermediate floating point result so that the most significant binary "1" of the mantissa resides in the L bit, which is the most significant bit of the mantissa. Bit L is labeled as 24 in FIGS. 1 and 6. The exponent is decremented for each 1-bit left-shift of the mantissa. During normalization, the G and R bits are also shifted, with zeros shifted into the round bit. A single precision example of prior art normalization is shown below in Table 1, where variables W,X,Y, and Z represent any value. N represents any exponent value greater than or equal to Emin +1, where Emin is the minimum exponent capable of representation in the floating point unit.

TABLE 1

| EXP | L | REMAINING BITS OF FRACTION | G | R | S |
|---|---|---|---|---|---|
| N | 0 | 1XXXXXXXXXXXXXXXXXXXXXXX | W | Y | Z |
| N − 1 | 1 | XXXXXXXXXXXXXXXXXXXXXXXW | Y | Z | 0 |

In Table 1, the top fraction has the most significant binary "1" of the fraction residing one bit to the right of the L bit. The top fraction thus represents a value that requires a 1-bit shift left in order to be normalized according to the IEEE standard. The bottom fraction of Table 1 shows a normalized fraction with the most significant binary "1" of the fraction shifted into the L bit. After the one-bit left shift, the top fraction of Table 1 is in the IEEE normalized format. During normalization, the exponent of the top fraction is decremented by one for each one-bit left shift. The top and bottom mantissas of Table 1 are equivalent if the value of the bottom floating point number's exponent is one less than the value of the top number's exponent Rounding is then performed in the prior art on the normalized intermediate fraction. Rounding is performed by incrementing the normalized intermediate result if required. Since normalization and rounding are performed sequentially in the prior art, the latency of the execution pipeline includes the delay of both the normalizer and rounder circuits.

A method and apparatus that allows the normalization and rounding functions to operate in parallel eliminates the delay of the rounder from the execution pipeline. U.S. Pat. No. 4,926,370 to Brown et al (Brown '370) describes an implementation for performing the normalization and rounding functions in parallel. Brown '370 incorporates another patent, U.S. Pat. No. 4,941,920 to Brown et al (Brown '120). The prior art performs parallel normalization and rounding in the following manner.

The first two bits of the mantissa of the intermediate result of a floating point arithmetic operation are examined to determine the format of the mantissa. Also, a check is made to determine what type of arithmetic operation has been performed. Under certain format/operation combinations the intermediate mantissa is loaded directly into a register shown as register 16 on FIG. 2. Under certain other conditions the first of two potential shifts is performed on the intermediate mantissa before it is loaded into the register 16. The present invention does not have this first shift.

From register 16 (of FIG. 2) the intermediate mantissa is simultaneously passed to a normalizer circuit and a rounder circuit. The first two bit positions of the intermediate mantissa residing in register 16 are examined. If the 2-bit format of the first two mantissa bits in register 16 is 1.X, the rounder circuit is activated. If the 2-bit format is neither 1.X nor 0.1X, the normalizer circuit is activated. If the 2-bit format is 0.1X the intermediate result mantissa is shifted left one position and the rounder circuit is then activated. The present invention does not have this second shift.

Therefore, the prior art requires two additional multiplexers in order to accomplish the preliminary normalization and rounding shifts that may be required. This preliminary shifting requirement and its attendant multiplexers are not necessary in the present invention.

The present invention reduces the latency of the floating point execution pipeline by allowing the normalization and rounding functions to be performed in parallel, eliminating the delay of the rounder from the total execution pipeline delay. The present invention also presents an improvement over the prior art because it does not require shifting of the intermediate mantissa prior to normalization and rounding. Instead, the intermediate result mantissa of an extended precision floating point arithmetic operation (or the intermediate result fraction of a single- or double-precision floating point arithmetic operation) is transferred directly into a register 610 (of FIG. 6), without a check of the operation type or first two bits of the intermediate result mantissa or fraction. The present invention transfers the intermediate mantissa or fraction directly into the register 610 without any intermediate shifting, eliminating the first additional multiplexer 15 (of FIG. 2) present in the prior art. The rounder circuit and the normalizer circuit of the present invention receive the intermediate mantissa or fraction from the register 610 in parallel. The present invention does not require a left-shift prior to rounding for an intermediate mantissa beginning with a 2-bit format of 0.1X, thus eliminating the need for the second additional multiplexer 53 of the prior art. The present invention performs a novel type of normalization. The normalizer circuit of the present invention performs normalization of the intermediate mantissa or fraction by 1) pre-incrementing the exponent by 1,2) shifting of the most significant binary "1" of the mantissa into the C bit rather than the L bit, and 3) decrementing the exponent in accordance with the number of left shifts performed for normalization. The present invention then selects and formats the correct result mantissa or fraction.

SUMMARY OF THE INVENTION

The present invention describes a method and apparatus that performs normalization and rounding on an ANSI/IEEE 754-1985 floating point intermediate result having a mantissa or fraction and an exponent. The apparatus contains circuits that adjust the exponent, normalize the fraction or mantissa, round the fraction or mantissa, and perform control functions. The apparatus also contains circuits that perform selection and formatting logic in order to dispense with the need for shifting of the intermediate result prior to normalization or rounding. The exponent of the intermediate result is pre-incremented prior to normalization. Normalization of the present invention requires shifting the most significant binary "1" of the intermediate fraction or mantissa into the carry bit. Normalization also requires a corresponding decrement of the exponent for each left shift performed. The selection logic examines the C bit and the L bit and the most significant bit of the intermediate fraction in order to determine whether/how many left shifts are required to normalize into the C bit (0-bits, 1-bit, 2-bits, or >2-bits). The select logic also examines the values of the Gin bit, the Rin bit, and the round control bit. Based on the above inputs, the select logic will select one of six possible formatting procedures to use in generating the output fraction or mantissa. Formatting logic then appropriately formats the result fraction or mantissa. With the present invention, the need to use the output from the normalizer or rounder circuit is completely predictable and the operation of normalization and rounding can be accomplished as a parallel process rather than as a sequential operation.

The present invention additionally describes an apparatus and method that selects the formatting procedure used to produce the output result fraction or mantissa of an ANSI/IEEE 754-1985 floating point arithmetic operation where parallel normalization and rounding of the intermediate result fraction or mantissa has occurred. The C bit and the L bit and the most significant bit of the intermediate fraction are examined in order to determine how many, if any, left shifts (with an accuracy of 0, 1, 2, or >2-bits) are required to normalize the most significant binary "1" of the intermediate mantissa or fraction into the carry bit. The Gin bit, Rin bit, and round control bit are also examined. The Gin bit occupies the bit position directly to the left of the G bit. The Rin bit occupies the bit position directly to the left of the R bit. The Rin bit and the G bit therefore occupy the same bit position.

A first select format value is selected if no shift is required and rounding is required. A second select format value is selected if a one-bit left shift is required and rounding is required and the Gin bit is set. A third select format value is selected if rounding is not required. A fourth select format value is selected if a one-bit left shift is required and rounding is required and the Gin bit is not set. A fifth select format value is selected if a two-bit left shift is required and rounding is required and both the Gin bit and the Rin bit are set. A sixth select format value is selected if a two-bit left shift is required and rounding is required and either the Gin bit or the Rin bit, or both, are not set.

The present invention additionally describes an apparatus and method that formats the output result fraction or mantissa of an ANSI/IEEE 754-1985 single precision, double precision, or extended precision floating point arithmetic operation where parallel normalization and rounding of the intermediate result has occurred, using six different formatting procedures. The first format procedure defines the output result mantissa or fraction to be identical to the output from the rounder circuit. The second format procedure simulates a one-bit left shift and rounding when the Gin bit is set. Using this procedure, the most significant bits of the output result mantissa or fraction comprise bits N−2 through 0 of the rounder circuit output, and the least significant bit comprises a binary "0", simulating the result of incrementing a bit position previously occupied by a binary "1" (a carry out of the LSB is generated). Under the third format procedure, the result mantissa or fraction comprises the output from the normalizer circuit and simulates normalization when no rounding is required. The fourth format procedure simulates a one-bit left shift and rounding when the Gin bit is not set. Using this procedure, the most significant bits of the output result mantissa or fraction comprise bits N−1 through 1 of the normalizer circuit output, and the least significant bit comprises a binary "1", simulating the result of incrementing a bit position previously occupied by a binary "0". The fifth format procedure simulates a two-bit left shift when rounding is required and the Gin bit and Rin bit are set. Using this procedure, the most significant bits of the output result mantissa or fraction comprise bits N−3 through 0 of the rounder circuit output. In order to simulate the carry propagated during rounding, the two least significant bits of the output result mantissa or fraction are defined to be binary "00". The sixth format procedure simulates a two-bit left shift when rounding is required and either the Gin bit or the Rin bit, or both, have been reset. Using this procedure, the most significant bits of the output result mantissa or fraction bits N−1 through 2 of the normalizer circuit output, thus simulating the two-bit left shift. In order to simulate rounding, the least two significant bits of the result mantissa or fraction are set as follows: "01" if both the Gin bit and Rin bit have been reset, "10" if the Gin bit was reset and the Rin bit is set, and "11" if the Gin bit is set and the Rin bit has been reset.

The present invention additionally describes an apparatus and method that normalizes an ANSI/IEEE 754-1985 floating point arithmetic intermediate result having a mantissa or fraction and an exponent. The exponent is pre-incremented by one prior to normalization. During normalization, the most significant binary "1" of the mantissa or fraction is shifted left until it resides in a carry bit. For each left shift performed, the exponent is decremented once.

DESCRIPTION OF DRAWINGS

To further aid in understanding the invention, the attached drawings help illustrate specific features of the invention and the following is a brief description of the attached drawings.

DETAILED DESCRIPTION OF THE INVENTION

Figure 1:
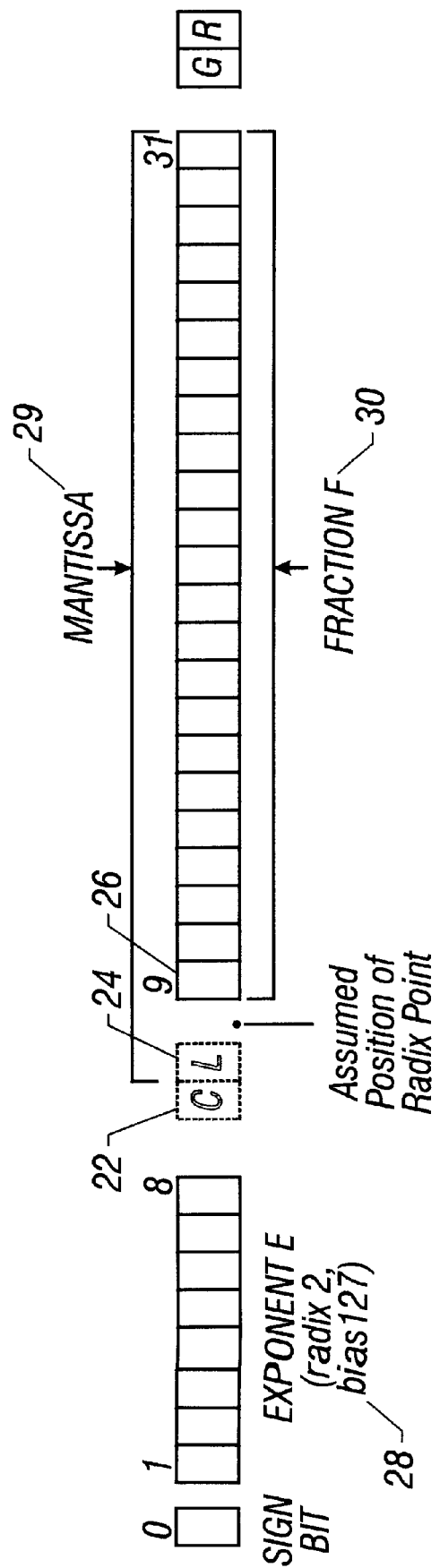
FIG. 1 is a block representation of the ANSI/IEEE 754-1985 standard bit format for normalized single precision floating point representation of numbers.

The present invention comprises a method and apparatus for parallel rounding and normalization of an intermediate floating point result without shifting prior to normalization or rounding. This allows the present invention to avoid the inefficiency of the two additional multiplexer delays required by the prior art. This disclosure describes numerous specific details that include specific formats, structures, circuits, and logic functions in order to provide a thorough understanding of the present invention. One skilled in the art will appreciate that one may practice the present invention without these specific details. Additionally, this disclosure does not describe in detail some well-known structures such as multiplexers nor some well-known aspects of the IEEE/ANSI 754-1985 standard in order not to obscure the present invention.

The present invention presents a method and apparatus for parallel normalization and rounding of the result of a floating point arithmetic operation. Unlike the prior art, the present invention requires no shifting prior to normalization or rounding. Also unlike the prior art, the present invention pre-increments the exponent by 1 before normalization. Normalization in the present invention presents a requirement that the most significant binary "1" of the fraction (or mantissa, for extended precision operations) be shifted in the C bit while the exponent is decremented accordingly. The present invention then uses select logic to select, and format logic to format, a correctly normalized (if necessary) and rounded (if necessary) fraction or mantissa.

The present invention is described herein in the context of a floating point unit conducting floating point operations in the extended precision format. Those skilled in the art will recognize that the present invention is not limited to extended precision units, but is also applicable to floating point operations conducted in single and double precision formats. Consequently, the term "mantissa" as used in this description should be replaced with the term "fraction" when the present invention is practiced in the context of a floating point unit conducting operations in either the single or double precision format.

The Four Possible Mantissa Formats. Any apparatus or method that performs parallel rounding and normalization for floating point arithmetic operations must be able to properly perform normalization and/or rounding on every potential fraction result of addition, subtraction, multiplication, and division. Floating point arithmetic operations will always produce unnormalized intermediate result mantissas comprising one of the four possible formats illustrated in Table 2, where the variable X represents any value.

TABLE 2

| FORMAT | BIT PATTERN | PRODUCING OPERATION(S): | ROUND | NORMALIZE - present invention | NORMALIZE - prior art |
| --- | --- | --- | --- | --- | --- |
| Format 1 | 01.XXXX..XX | Addition, Subtraction, Multiplication (pre-normalized), or Division (2-bit non-restore/pre-normalized) | May be required | 1-bit left shift | Not required |
| Format 2 | 00.1XXX..XX | Subtraction or Division (2-bit non-restore/pre-normalized) | May be required | 2-bit left shift | 1-bit left shift |
| Format 3 | 00.0XXX..XX | Subtraction | No | More than 2-bit left shift | More than 1-bit left shift |
| Format 4 | 1X.XXXX..XX | Addition or Multiplication (pre-normalized) | May be required | Not required | Not required |

Table 2 illustrates the possible formats of intermediate mantissas produced as the result of each arithmetic operation. A multiplication operation utilizing pre-normalized operands will result in a product of either Format 1 or Format 4. A division operation performed using a 2-bit non-restore divide algorithm that uses pre-normalized operands will produce a quotient in either Format 1 or Format 2. Addition operations between operands that are pre-normalized and pre-aligned can produce results in Formats 1 or 4. Subtraction operations between operands that are pre-normalized and pre-aligned can produce results in Formats 1, 2, or 3.

Rounding Requirements for the Four Formats. Each of the four formats presents its own unique rounding and normalization processing requirements. The "Round" column of Table 2 demonstrates the rounding requirements for each of the four formats. Table 2 illustrates that rounding may only be required for intermediate mantissas of Formats 1, 2, or 4.

Rounding will never be required for Format 3. Format 3 is unique because it only occurs as the result of a subtract operation. There are four cases where a subtract operation can produce the third format. These situations are depicted below in Table 3, where Ea is the exponent of operand A, Eb is the exponent of operand B, and Emin is the minimum exponent capable of representation within the floating point unit.

TABLE 3

| CASE | EXPONENT RELATIONSHIP | CONDITION OF OPERANDS | ROUND REQUIRED |
| --- | --- | --- | --- |
| a) | Ea = Eb | Both normalized | No |
| b) | Ea − Eb = 1 or Eb − Ea = 1 | Both normalized | No |

TABLE 3-continued

| CASE | EXPONENT RELATIONSHIP | CONDITION OF OPERANDS | ROUND REQUIRED |
| --- | --- | --- | --- |
| c) | Ea=Eb=Emin | One normalized, one denormalized | No |
| d) | Ea=Eb=Emin | Both denormalized | No |

Regarding cases a, c, and d in Table 3, no rounding is required. An add or subtract operation may only be performed on two floating point operands if their exponents are equal. If the exponents are not equal, then alignment must take place to render the exponents equal before the addition or subtraction can be performed. Regarding cases a, c, and d depicted in Table 2, the exponents of the two operands are equivalent and no alignment is required prior to subtraction to equalize the exponents. If no pre-subtraction operand exponent alignment occurs, then none of the G, R, or S bits will be set. The G, R and S bits must still equal zero following the subtract operation because they are initialized to zero by the control logic prior to the subtract operation. If G=R=S=0, then the normalized intermediate fraction result is exact and rounding is not possible. Therefore, cases a, c and d will not require rounding.

Case b depicted in Table 3 also does not require rounding even though the initial exponents of the operands are not equal. Case b of Table 3 indicates that an intermediate mantissa of Format 3 occurs when the exponents have a difference of 1. If the exponent difference is 1 then the pre-operation alignment will produce a one-bit right shift, which can only set the G bit but not the R or S bits. An intermediate mantissa of Format 3 (00.0XXX . . . XX) will require, at a minimum, a three-bit left shift under the present invention for normalization of the most significant binary "1" of the fraction 30 (of FIG. 1) into the C bit. In the prior art, an intermediate mantissa of Format 3 will require a minimum 2-bit left shift for normalization of the most significant binary "1" of the mantissa 29 into the L bit. Under either approach, the G bit will be forced to zero as zeros are shifted from the R bit into the G bit during post-subtraction normalization. Accordingly, if G=R=S=0, then the normalized intermediate fraction result is exact and rounding is not possible. Therefore, rounding will never be required for a Format 3 intermediate fraction.

In sum, rounding may be required in the present invention and in the prior art for Formats 1,2, and 4. Rounding will never be required for Format 3 in either the present invention or the prior art.

Normalization Requirements: Prior Art versus Present Invention.

The prior art includes several different techniques for parallel rounding and normalizing in floating point operations. Two such techniques are in the Brown '370 patent and the Brown '120 patent. The prior art and the present invention differ significantly in the technique where each implements the normalization function. There are both logical and structural differences between the normalization techniques of the prior art and the present invention.

Logic Differences. One difference between normalization in the prior art and the present invention lies in the number of left shifts performed in normalization for each Format (1, 2, 3, and 4). Normalization in the prior art results in the most significant binary "1" of the mantissa residing in the L bit, with the exponent 28 (of FIG. 1) being decremented for each 1-bit left-shift. The values in the "Normalize—prior art" column of Table 2 therefore reflect the number of left shifts required to shift the most significant binary "1" of the mantissa into the L bit. In contrast, the present invention performs a carry-out shift such that normalization results in the most significant binary "1" of the mantissa 29 (of FIG. 1) residing in the C bit. Thus, the values in the "Normalize—present invention" column of Table 2 reflect the number of left shifts required to shift the most significant binary "1" of the mantissa into the C bit.

A second logical difference between the prior art and the present invention lies in the manner the exponent 28 (of FIG. 1) is manipulated during normalization. Of course, normalization requires that the exponent be decremented by 1 each time the fraction is shifted left by one bit. The present invention provides additional logic that pre-increments the exponent 28 by 1 prior to normalization.

Structural Differences. The shifting required in the prior art preliminary to normalization and/or rounding produces a need for certain structures to be present in the prior art. Specifically, the prior art requires additional multiplexer 15, shown in FIGS. 2, 3, and 4, and multiplexer 56, shown in FIG. 2. Such multiplexers are utilized by the prior art as described below.

Figure 2:
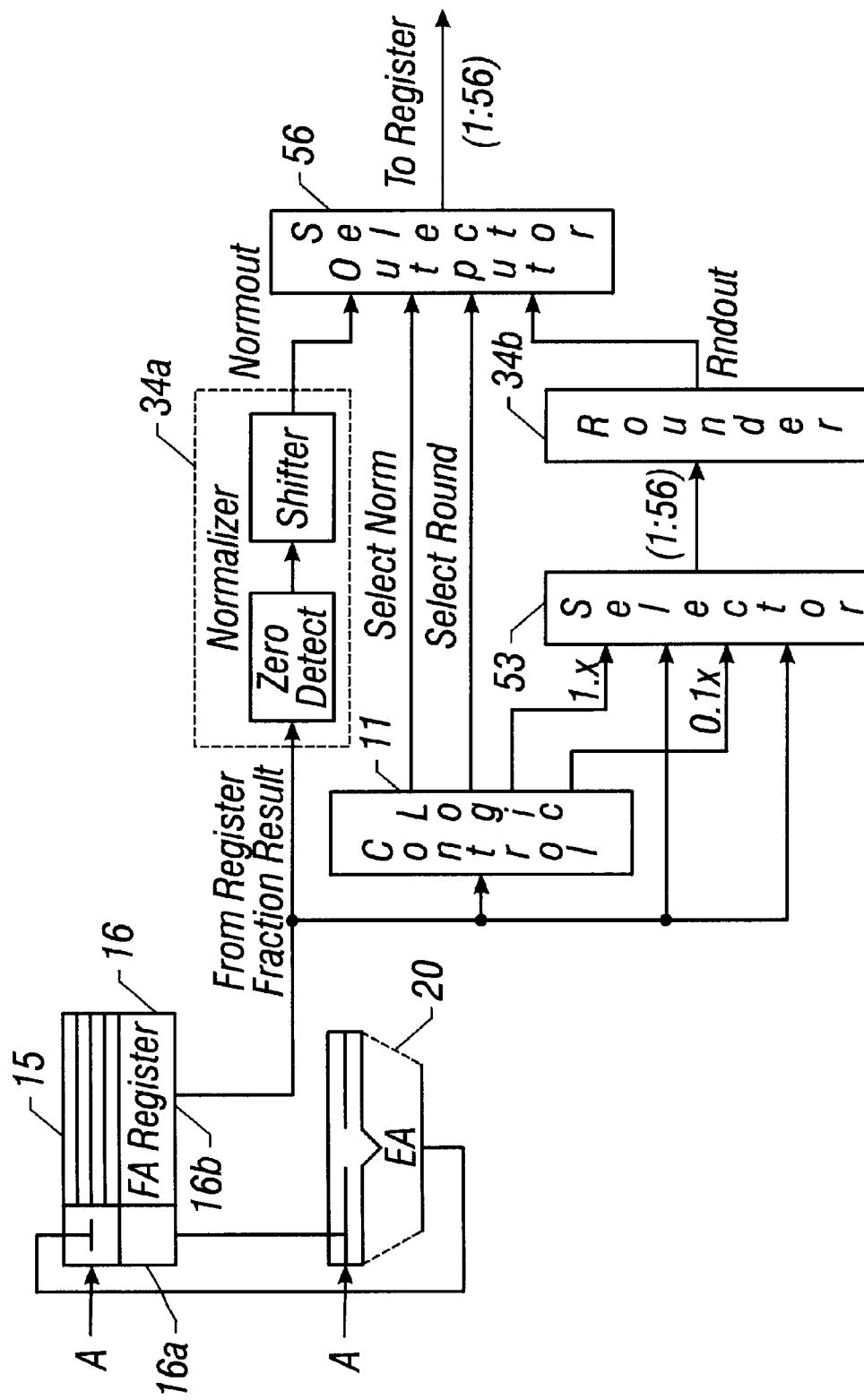
FIG. 2 is a block diagram of the prior art floating point arithmetic circuit for parallel normalizing and rounding.
Figure 3:
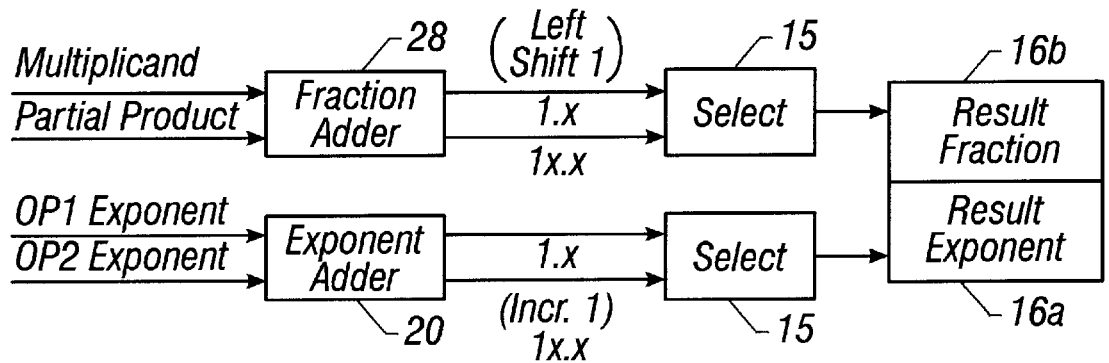
FIG. 3 is a data flow diagram for prior art normalization and rounding for multiply operations.

FIG. 2 represents the prior art circuit for parallel normalization and rounding. The prior art shifts intermediate fractions resulting from a multiplication operation, if necessary, prior to rounding. This pre-shift allows the prior art to skip normalization for intermediate multiplication results. Referring to FIG. 3, if the mantissa of the unnormalized prior art intermediate multiplication result is 01.X . . . XX, the prior art uses multiplexer 15 located above the normalizer 34a and the rounder 34b to shift the fraction left one bit. The result of exponent adder 20 is not changed. This shifted result will be rounded, if necessary, but not normalized.

The prior art does not require shifting by multiplexer 15 for multiplication results of format 1X.X . . . X. Referring to FIG. 3, if the unnormalized intermediate multiplication result is of format 1X.X . . . X, it is not shifted by multiplexer 15 and the exponent adder 20 output is adjusted by +1.

Figure 4:
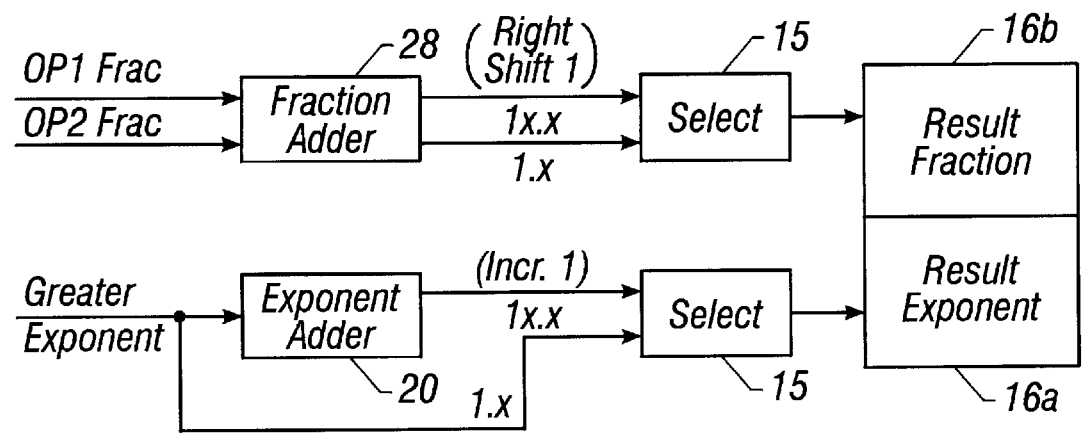
FIG. 4 is a data flow diagram for prior art normalization and rounding for addition operations.

The prior art handles addition and subtraction intermediate fractions in a manner different from multiplication intermediate fractions. In the prior art handling of an unnormalized format 1X.X . . . X mantissa resulting from an addition or subtraction operation, a right-shift occurs. Referring to FIG. 4, if the unnormalized intermediate result is of format 1 X.X . . . X, it is shifted right one bit by multiplexer 15 located above the normalizer 34a and rounder 34b. The exponent adder 20 output is adjusted by +1.

The prior art also pre-shifts addition and subtraction intermediate mantissas of format 0.1X . . . X. Referring to FIG. 2, if the unnormalized intermediate result an addition or subtraction operation is of Format 0.1X . . . X, a one-bit left shift will be performed by multiplexer 53 before the intermediate fraction is transferred to the rounder circuit 34b. This approach requires an additional multiplexer 53 in the data path, which is not required under the present invention.

Preferred Embodiment of Present Invention.

The present invention avoids two structural elements (multiplexer 15 on FIGS. 2, 3, and 4 and multiplexer 53 on FIG. 2) present in the prior art. The present invention performs an exponent pre-increment procedure. A carry-out shift then occurs during normalization. Finally, the present invention uses logic to select and format the properly rounded (if necessary) and normalized (if necessary) fractional result of the floating point arithmetic operation.

Figure 5:
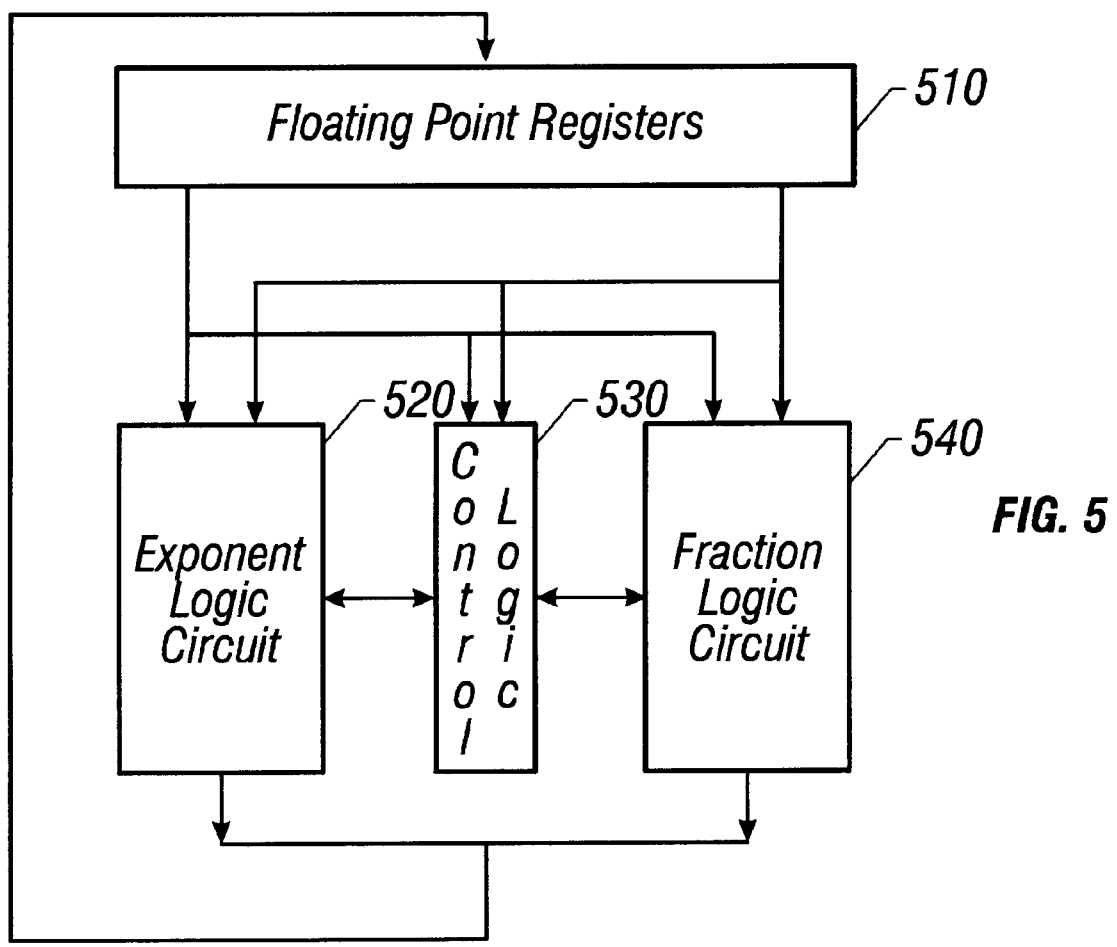
FIG. 5 is a block diagram of the present invention.

FIG. 5 is a block diagram of the present invention, according to one embodiment. FIG. 5 illustrates that the present invention comprises a set of floating point registers 510. For single and double precision numbers, such registers 510 contain the sign bit, exponent 28 (of FIG. 1) and fraction 30 (of FIG. 1). For extended precision numbers, the floating point registers 510 contain the sign bit, exponent 28 and mantissa 29. FIG. 5 further illustrates that the present invention also comprises a control logic circuit 530, an exponent logic circuit 520, and a fraction logic circuit 540.

Pre-Increment of Exponent. A feature of the present invention is that it increments the exponent 28 (of FIG. 1) by 1 before normalization processing. Referring to FIG. 5, the exponent logic 520 adds 1 to the exponent 28. The fraction logic 540 then performs a carry-out shift if normalization is required.

Carry-Out Shift. In the present invention, the shifts performed by multiplexers 15 and 53 in the prior art are not performed prior to normalization or rounding. During normalization, the present invention performs a novel carry-out shift procedure.

Figure 6:
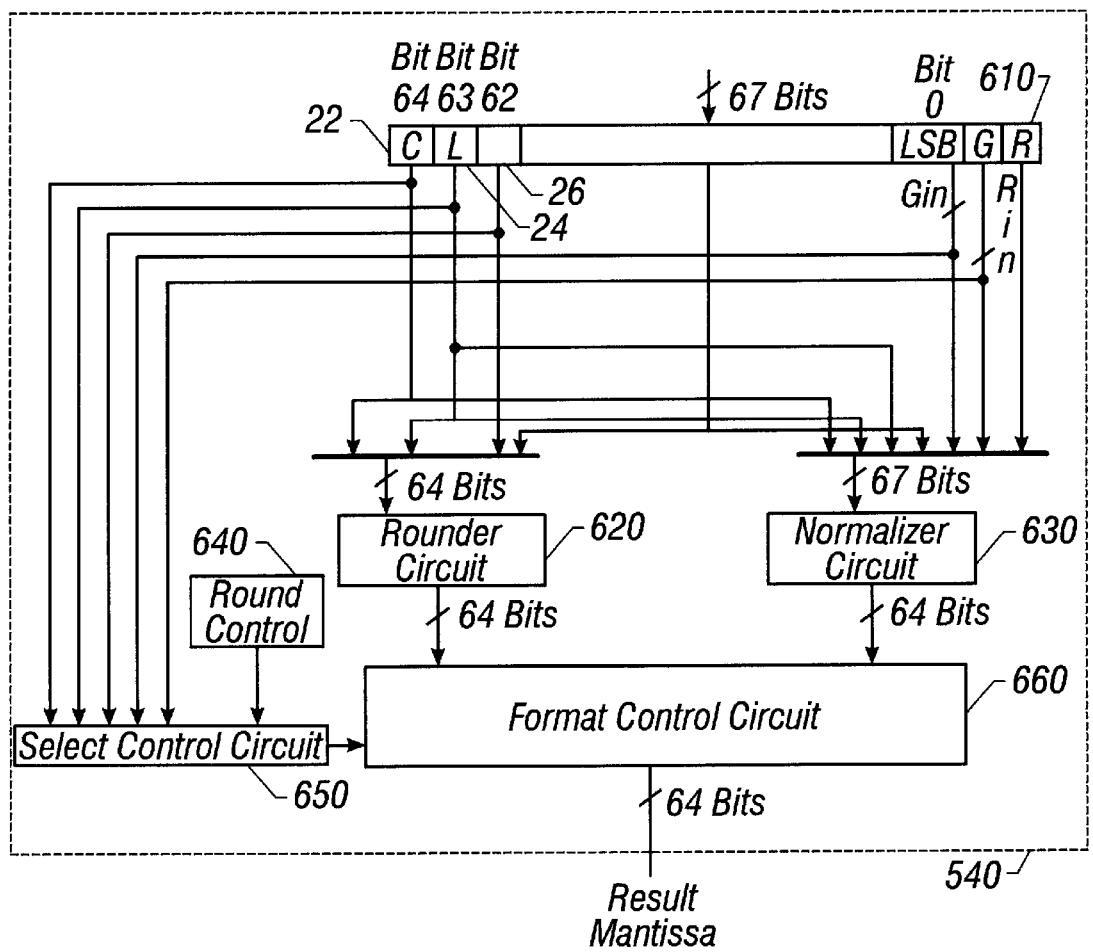
FIG. 6 is a block diagram of the logical data flow in the fraction logic circuit of the present invention, shown in the context of an extended precision floating point operation.

FIG. 6 represents the fraction logic circuit 540 of the present invention. The normalizer circuit 630 of the present invention always shifts the most significant binary "1" of the mantissa 29 into the carry-out bit position C 22. The C bit resides one bit position to the left of the L bit 24. The L bit is bit 63 of an extended format mantissa, as depicted in FIG. 6. The carry-out shift effectively converts all intermediate mantissas into Format 4, which contains a binary "1" in the C bit position. A single precision example is shown below in Table 4, where variables W,X,Y, and Z represent any value. N represents any exponent value less than or equal to Emax −1, where Emax is the maximum exponent capable of representation in the floating point unit.

TABLE 4

| EXP | C | L | FRACTION | G | R | S |
|---|---|---|---|---|---|---|
| N | | 1 | XXXXXXXXXXXXXXXXXXXXXXX | W | Y | Z |
| N + 1 | 1 | X | XXXXXXXXXXXXXXXXXXXXXXW | Y | Z | 0 |

The top row of Table 4 shows an example Format 1 mantissa, having its most significant binary "1" residing in the L bit. The top mantissa thus represents a value that is normalized according to the IEEE standard. The bottom row of Table 4 shows the same mantissa after a carry-out shift, with the most significant binary "1" of the mantissa shifted into the C bit. After the carry-out shift, the bottom mantissa of Table 4 is of Format 4. The top and bottom mantissas of Table 4 are equivalent if the bottom floating point value has +1 added to the exponent 28 (implying a 1-bit right shift). Since the intermediate exponent of the present invention is always pre-incremented by +1 (implying a 1-bit right shift), the normalized mantissa of the present invention will include the C bit whereas prior art normalized mantissas shift the most significant "1" into the L bit but not the C bit. Accordingly, the value of the G, R, and S bits will be located 1 bit position to the left of their normal position, with the value of the G bit residing in the Gin bit position and the value of the R bit residing in the Rin bit position.

The next step of the carry-out shift is executed by the exponent logic circuit 520 (of FIG. 5). For each left shift that occurs in the normalizer circuit 630 to shift the most significant binary "1" of the mantissa 29 into the C bit, a 1 is subtracted from the exponent 28. This part of normalization is well known in the art.

The result of the present invention's exponent pre-increment and carry-out shift is that all normalizer circuit output mantissas resemble a Format 4 because the most significant binary "1" of the mantissa 29 resides in the C bit. However, the exponent 28 reflects the value it would have for a Format 1 fraction. For example, an unnormalized intermediate mantissa of Format 1 will be shifted left one bit by the carry-out shift of the present invention, shifting the most significant 1 of the mantissa 29 into the C bit. In conjunction with the one-bit shift left the exponent logic circuit 520 of the present invention will subtract an additional one from the exponent 28. Since the exponent 28 is always pre-incremented by +1 prior to normalization in the present invention, the exponent pre-increment and −1 exponent adjustment associated with the 1-bit left shift will cancel each other out (−1+1=0). Therefore, the normalizer circuit 630 will produce a Format 4 mantissa and the exponent logic circuit 520 will produce a Format 1 exponent.

Each of the four formats of intermediate mantissas produces this same result. For example, an unnormalized Format 4 intermediate mantissa will also emerge from the normalizer circuit 630 with a Format 4 mantissa while the exponent logic circuit 520 produces a Format 1 exponent. An unnormalized intermediate result of Format 4 requires no left shifting for normalization, thus the +1 exponent adjustment will not be canceled out, and the final exponent 28 will be larger by +1 than the Format 4 exponent, resulting in a Format 1 exponent. The format control circuit 660 of the present invention, discussed below, efficiently formats the Format 4 normalizer circuit 630 output mantissa into the appropriately normalized and rounded Format 1 result mantissa.

Select Control Logic. The select control circuit 650 generates one of six select values (S0, S1, S2, S3, S4 or S5) that correspond to the 6 formatting options of the present invention. The 6 formatting options of the present invention are designated herein as D0, D1, D2, D3, D4, and D5. As described in further detail below, each of the 6 formatting options generates a normalized and rounded (if appropriate) Format 1 result mantissa from a particular output of either the normalizer circuit 630 or the rounder circuit 620.

The select control circuit 650 utilizes the fact that there are only four possible combinations of actions required to normalize and round an intermediate fraction in the present invention. Table 5 shows the four actions necessary under the present invention to normalize (into the C bit) and round an unnormalized intermediate mantissa. Table 5 illustrates the functions required for parallel normalization and rounding and shows that it is never necessary to both 1) shift left more than two bits for normalization and 2) round the intermediate fraction.

TABLE 5

| | # OF BITS TO SHIFT LEFT TO NORMALIZE INTO C BIT | ROUND | WHEN REQUIRED |
|---|---|---|---|
| 1 | Zero bits shift left (S0) | YES | Format 4, when rounding is required |
| 2 | One bit shift left (S1, S3) | YES | Format 1, when rounding is required |
| 3 | 0–N bit shift left (S2) | NO | Format 3 Format 1, if no round Format 2, if no round Format 4, if no round |
| 4 | Two bit left shift (S4, S5) | YES | Format 2, when rounding is required |

The first of the four potential actions required to normalize and/or round, Selection S0, is represented in Row 1 of Table 5. S0 is the case where the intermediate result is of Format 4 and rounding is required. [Table 6 lists the select equations for select values (S0, S1, S2, S3, S4 and S5)]. Format 4 requires no shifting since the most significant binary "1" of the mantissa 29 already resides in the C bit. Selection S0 therefore corresponds to a formatting procedure that requires no left shift but does require rounding.

The second of the four potential actions required to normalize and/or round involves Selections S1 and S3, and is represented in Row 2 of Table 5. Selections S1 and S3 occur where the intermediate mantissa is of Format 1, and rounding is required. Format 1 requires a 1-bit left shift under the present invention in order to normalize such that the most significant binary "1" of the mantissa 29 resides in the C bit. Selections S1 and S3 therefore correspond to a formatting procedure that requires both a one-bit left shift and rounding.

The third of the four potential actions required to normalize and/or round, involves Selection S2, and is represented in Row 3 of Table 5. Selection S2 occurs where no rounding is required. This selection involves every occurrence of Format 3. From the foregoing discussion of Table 2, it is apparent that an intermediate mantissa of Format 3 will never require rounding, although it will require at least a three-bit left shift for normalization into the C bit. Selection S2 also includes every occurrence of Format 1, 2, or 4 for the intermediate mantissa when rounding is not required. Selection S2 therefore corresponds to a formatting procedure that requires a left shift of 0 or more bits, but does not require rounding.

The last of the four potential actions required to normalize and/or round involves Selections S4 and S5, and is represented in Row 4 of Table 5. Selections S4 and S5 occur where the intermediate mantissa is of Format 2 and rounding is required. Format 2 requires a two-bit left shift for normalization into the C bit. Selections S4 and S5 therefore correspond to a formatting procedure that requires both a two-bit left shift and rounding.

The select control circuit 650 sets as an output one of the six select values: S0, S1, S2, S3, S4, S5. In determining the value to set, the select control circuit 650 utilizes the following inputs: round control 640 output, the value of the Gin input to the normalizer circuit 630, the value of the Rin input to the normalizer circuit 630, and the format type of the intermediate fraction. The value of Gin determines whether S1 or S3 will be set for a Format 1 intermediate mantissa that requires rounding. Similarly, the values of Gin and Rin determine whether the select control circuit will set S4 or S5 for a Format 2 intermediate mantissa that requires rounding.

One method for determining the format type of the intermediate mantissa is to examine one or more of the following three bits: the C bit 22, the L bit 24, and the most significant bit 26 of the intermediate fraction. The select control circuit 650 uses the value of the C bit to detect Format 4. The C bit and the L bit are used together to detect Format 1. All three bits are used together to detect Format 2. The select control circuit 650 does not detect Format 3 (0.0) because it is not necessary to detect Format 3 to set the proper select value (S2) as the select control circuit 650 output. As explained above, rounding is never required for Format 3. Thus, if the round control 640 bit is not set, the select control circuit 650 sets Selection S2 as its output, causing the result mantissa output from the format control circuit 660 to be generated using the D2 format procedure.

Table 6 illustrates the logic equations of the select control circuit 650 in setting one of the six select values, S0–S5, when the format type of the intermediate mantissa is determined through examination of the C bit, L bit, and the most significant bit of the intermediate fraction, and when the select control circuit 650 also examines the Gin and Rin values and the round control 640 output.

TABLE 6

| | |
|---|---|
| S0 | (mantissa format = 1X.X) AND (round) |
| S1 | (mantissa format = 01.X) AND (round) AND (Gin = 1) |
| S2 | (no round) |
| S3 | (mantissa format = 01.X) AND (round) AND (Gin = 0) |
| S4 | (mantissa format = 00.1) AND (round) AND (Gin = 1) AND (Rin = 1) |
| S5 | (mantissa format = 00.1) AND (round) AND NOT[(Gin = 1) AND (Rin = 1)] |

Figure 7:
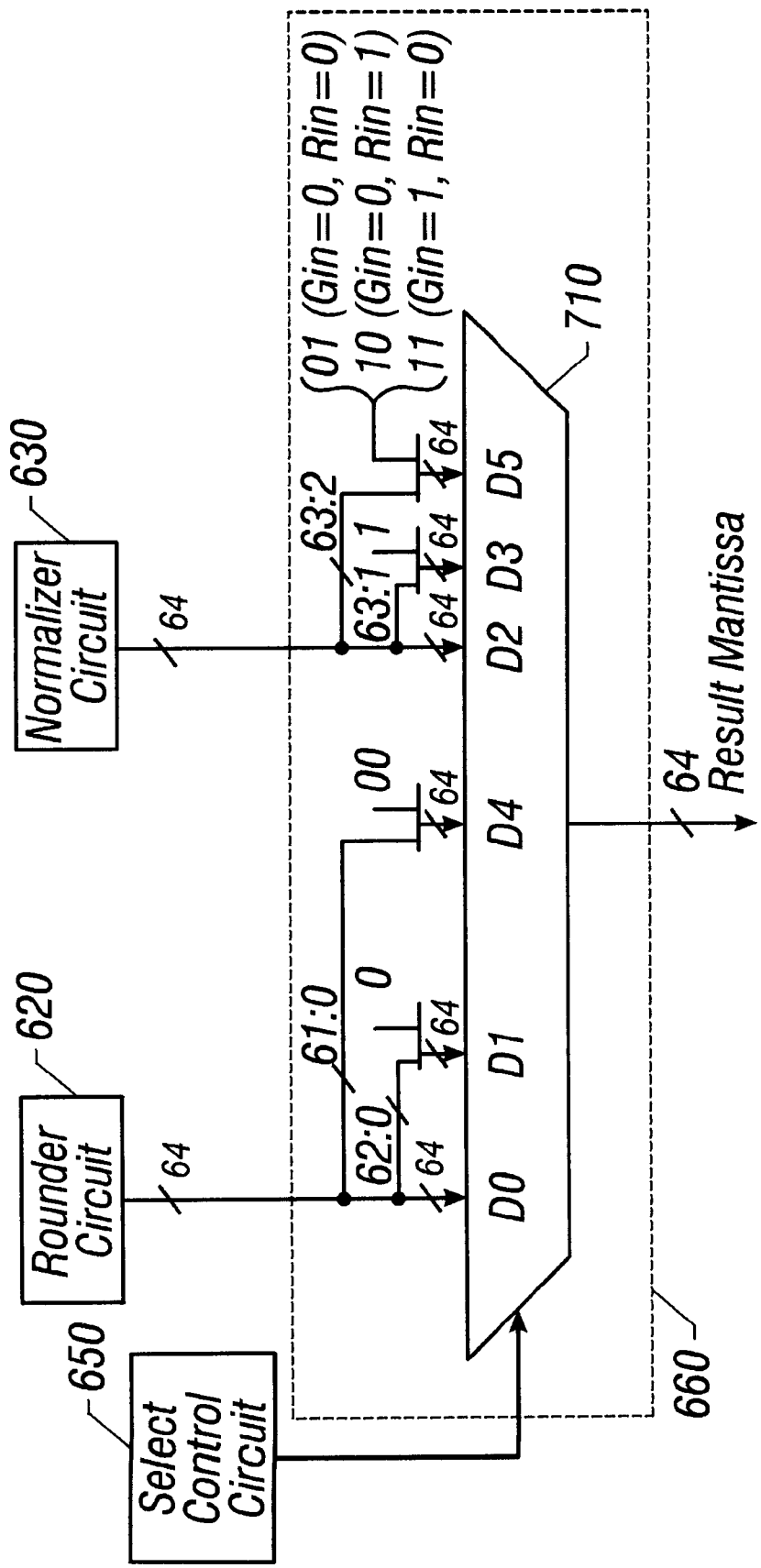
FIG. 7 is a block diagram of the logical data flow in the format control circuit of the present invention, shown in the context of an extended precision floating point operation.

Formatting Logic. FIG. 7 illustrates the format control circuit 660 of the present invention which further comprises a multiplexer 710 with the associated multiple inputs as depicted in the figure. The format control circuit 660 provides a result mantissa output using one of six different (D0, D1, D2, D3, D4 and D5) formatting procedures. The 64-bit output from the rounder circuit 620 and the normalizer circuit 630 are received by the format control circuit 660. The format control circuit 660 also receives as an input the output of the select control circuit 650. The output of the select control circuit 650 determines the format procedure, D0–D5, that will be used to generate the result mantissa output of the format control circuit 660.

Table 7 shows a summary of the formatting equation for each output format procedure, D0–D5, in an extended precision scheme.

TABLE 7

| Select Signal | Format Equation | Format Designation | Result mantissa Output |
|---|---|---|---|
| S0 | (shift left 0 bits) AND (round) | Output: D0 | Output of Rounder 620 |
| S1 | (shift left 1 bit) AND (round) AND (Gin=1) | Output: D1 | 63 least significant bits of Rounder 620 output, with 0 appended as least significant bit |
| S2 | (shift left 0 to N bits) and (no round) | Output: D2 | Output of Normalizer 630 |

TABLE 7-continued

| Select Signal | Format Equation | Format Designation | Result mantissa Output |
|---|---|---|---|
| S3 | (shift left 1 bit) AND (round) AND (Gin=0) | Output: D3 | 63 most significant bits of Normalizer 630 output, with 1 appended as least significant bit |
| S4 | (shift left two bits) AND (round) AND (Gin = 1) AND (Rin = 1) | Output: D4 | 62 least significant bits of Rounder 630 output, with binary "00" appended as two least significant bits |
| S5 | (shift left two bits) AND (round) AND NOT[(Gin=1) AND (Rin = 1)] | Output: D5 | 62 most significant bits of Normalizer 630 output, with least two significant bits appended as shown in Table 8 |

The format control circuit 660 will generate the result mantissa output using format D0 when the select control circuit 650 has set Select S0. The D0 format comprises the output from the rounder circuit 620.

The format control circuit 660 will generate the result mantissa output using format D1 when the select control circuit 650 has set Select S1. Similarly, the format control circuit 660 will generate the result mantissa using format D3 when the select control circuit has set Select S3. The D1 and D3 formats conceptually provide the function of shifting the input to the rounder circuit 620 left 1-bit before rounding. If a one-bit shift left and round is required, then the S1 or S3 selects will have been set by the select control circuit 650, dependent on the Gin value.

The difference between the D1 and D3 formats lies in the nature of the round function. The round function always increments the unnormalized intermediate mantissa at the least significant bit position (1-bit left of the G bit). If a one-bit left shift is required and a round is required, and the Gin value is 1, then a carry will propagate up to the higher order bits when the round is performed after the required one-bit left shift. In contrast, if the Gin value is 0, then the increment performed during rounding will not propagate up.

FIG. 7 and Table 7 illustrate that, for format D1, the following formatting logic is performed by the format control circuit 660 in order to simulate a one-bit left shift and a round, with the round propagating up. The format control circuit 660 formats as the most significant bits of the result mantissa the bits comprising bits N-2 through 0 of the rounder circuit 620 output, where N is the number of bits comprising the rounder circuit 620 output. For example, in an extended precision scheme, the most significant bits of a result mantissa produced using the D1 format would comprise bits 62 through 0 of the rounder circuit 620 output. Conceptually, this logic shifts the output from the rounder circuit 620 left by one bit. The D1 formatting logic in the format control circuit 660 then appends a binary "0" as the least significant bit of the result mantissa. This simulates Gin=1 shifting into the LSB of the fraction and then being incremented (which will force it to 0). The incrementing of the fraction LSB simulates the rippling of the carry out from the Gin bit to the fraction LSB that would have occurred if the 1-bit shift left had been performed prior to rounding.

FIG. 7 and Table 7 also illustrate the following formatting logic performed by the format control circuit 660 when the result mantissa is produced using format D3 (i.e., S3 is set). The D3 formatting logic simulates a one-bit left shift and a round when the Gin value is 0. Format control circuit 660 formats as the most significant bits of the result mantissa the bits comprising bits N-1 through 1 of the normalizer circuit 630 output, where N is the number of bits comprising the normalizer circuit 630 output. For example, in an extended precision scheme the most significant bits of a result mantissa produced according to the D3 format procedure would comprise bits 63 through 1 of the normalizer circuit 630 output. Conceptually, this formatting addresses the need for a one-bit left shift by loading the normalized Format 1 output of the normalizer circuit 630 into all bits of the result mantissa except the LSB. Since S0 is selected only when Gin=0, the format control circuit 660 then formats a binary "1" into the LSB of the result mantissa. This simulates Gin=0 shifting into the least significant bit of the mantissa 29 and then being incremented during rounding (which would set the LSB to 1). Conceptually, if the 1-bit shift left had been performed prior to the round, no carry out from the Gin bit to the mantissa 29 LSB would have occurred (since Gin=0).

The format control circuit 660 will generate the result mantissa using format D2 when the select control circuit 650 has set Select S2. The D2 format comprises the using the output from the normalizer circuit 630.

The format control circuit 660 will generate the result mantissa using format D4 when the select control circuit 650 has set Select S4. Similarly, the format control circuit 660 will generate the result mantissa using format D5 when the select control circuit has set Select S5. The D4 and D5 formats conceptually provide the function of shifting the input to the rounder circuit 620 left 2 bits before rounding. If a two-bit shift left and round is required, then the S4 or S5 selects are set by the select control circuit 650, dependent on the values of Gin and Rin.

As with D1 and D3, the difference between the D4 and D5 formats lies in the nature of the round function. With D4 and D5, the present invention must simulate carry propagation as a result of rounding after the G bit and the R bit have been shifted into the two least significant bits of the fraction. After a two-bit left shift for normalization, the rounding function will not cause a carry to propagate up unless both the Gin and Rin values are "1".

FIG. 7 and Table 7 additionally illustrate the formatting logic performed by the format control circuit 660 to generate the result mantissa using format D4. A result mantissa using format D4 will be generated by the format control circuit 660 if Select S4 is set by the select control circuit 650. Select S4 will be set if 1) a two-bit left shift is required, 2) rounding is required, and 3) Gin=1 and Rin=1. Format control circuit 660 formats as the most significant bits of the result mantissa bits N-3 through 0 of the rounder circuit 620 output, where N is the number of bits comprising the rounder circuit 620 output. For example, in an extended precision scheme the most significant bits of a result mantissa generated in accordance with the D4 format procedure would comprise bits 61 through 0 of the normalizer circuit 630 output. Conceptually, the D4 formatting procedure performs a two-bit left shift on the rounder circuit 620 output. The format control circuit 660 then formats "00" into the least two significant bits of the output. The D4 format simulates shifting the output of the rounder circuit 620 left by two bits, with zeros shifting into the two least significant bits of the output. This simulates Gin=1 and Rin=1 shifting into the two least significant bits of the mantissa 29, and then being incremented (which will force them to binary "00"). The incrementing at the two least significant bits of the mantissa 29 simulates the rippling of the carry-out from the G bit to the least significant bit of the fraction and the carry-out from the R bit to the G bit which would have occurred during rounding if the 2-bit shift left had been performed prior to the round.

FIG. 7 and Table 7 also illustrate the formatting logic performed by the format control circuit 660 to generate a result mantissa according to format D5. The format control circuit 660 will generate the result mantissa using format D5 if Select S5 is set by the select control circuit 650. Select S5 will be set if 1) a two-bit left shift is required, 2) rounding is required, and 3) either or both of the Gin and Rin values are reset to "0". In order to accomplish the two-bit left shift, the most significant bits of the normalizer circuit 630 output are utilized. Format control circuit 660 formats as the most significant bits of the result mantissa bits N-1 through 2 of the normalizer circuit 630 output, where N is the number of bits comprising the normalizer circuit 630 output. For example, in an extended precision scheme the most significant bits of the result mantissa would comprise bits 63 through 2 of the normalizer circuit 630 output. Conceptually, this effects the two-bit shift necessary for normalization by utilizing the 62 most significant bits of the normalizer circuit 630 output. The D5 formatting logic sets the two least significant bits of the result mantissa according to Table 8. This simulates Gin shifting into the next-to-least significant fraction bit and Rin shifting into the mantissa 29 LSB during the two-bit left shift required for normalization, and Rin then being incremented during rounding. Since S5 will not be set if both Rin and Gin are set, rounding cannot propagate a carry for the remaining three cases. The three cases of Rin and Gin possible for D5, and their associated two least significant bits, are depicted in Table 8, where all values represent binary values.

TABLE 8

| Gin | Rin | RESULT MANTISSA LEAST TWO SIGNIFICANT BITS |
|---|---|---|
| 0 | 0 | 01 |
| 0 | 1 | 10 |
| 1 | 0 | 11 |

In sum, the present invention describes a method and apparatus that performs normalization and rounding on an ANSI/IEEE 754-1985 floating point intermediate result. The exponent is pre-incremented by one prior to normalization shifting. During normalization, the most significant binary "1" of the mantissa is shifted left until it resides in the carry bit. For each left shift performed, the exponent is decremented once. The apparatus and method of the present invention dispense with the need for shifting of the intermediate result prior to normalization or rounding by performing selection and formatting logic. With the present invention, normalization and rounding can be accomplished as a parallel process rather than as a sequential operation.

The selection logic selects the formatting procedure that will be used to produce the output fraction result of an ANSI/IEEE 754-1985 floating point arithmetic operation where parallel normalization and rounding of the intermediate fraction result has occurred. The C bit and the L bit and the most significant bit of the intermediate fraction are examined in order to determine how many, if any, left shifts are required to normalize the most significant binary "1" of the intermediate mantissa into the carry bit. The Gin, Rin, and round control bit are also examined. Based on these inputs, one of six formats is selected.

The present invention additionally describes an apparatus and method that formats the output fraction result of an ANSI/IEEE 754-1985 floating point arithmetic operation where parallel normalization and rounding of the intermediate fraction result has occurred. Based on the select option generated by the select logic, the formatting logic will format the output fraction result using one of six formatting procedures.

Other embodiments of the invention will be apparent to those skilled in the art after considering this specification or practicing the disclosed invention. The specification and examples above are exemplary only, with the true scope of the invention being indicated by the following claims.

We claim:

1. A format control circuit that formats the result mantissa of an ANSI/IEEE 754-1985 floating point arithmetic operation, comprising:
   an input from the rounder circuit;
   an input from the normalizer circuit;
   an input from the select control circuit; and
   a multiplexer that couples to said input from the select control circuit, said input from the normalizer circuit, and said input from the rounder circuit, said multiplexer generates a result mantissa for a floating point arithmetic operation using a formatting procedure selected from the following group: D1, D3, D4, and D5.

2. The apparatus of claim 1 wherein the D1 formatting procedure comprises using as the most significant bits of said result mantissa the bits comprising bits N–2 through 0 of said input from the rounder circuit, where N is the number of bits comprising said input from the rounder circuit and the number of bits comprising said result mantissa, and wherein said result mantissa further comprises a binary "0" in its least significant bit.

3. The apparatus of claim 1 wherein the D3 formatting procedure comprises using as the most significant bits of said result mantissa the bits comprising bits N–1 through 1 of said input from the normalizer circuit, where N is the number of bits comprising said input from the normalizer circuit and the number of bits comprising said mantissa result format, wherein said mantissa result further comprises a binary "1" in its least significant bit.

4. The apparatus of claim 1 wherein the D4 formatting procedure comprises using as the most significant bits of said result mantissa the bits comprising bits N–3 through 0 of said input from rounder circuit, where N is the number of bits comprising said input from the rounder circuit and the number of bits comprising said result mantissa, and wherein said result mantissa further comprises a binary "00" in its two least significant bits.

5. The apparatus of claim 1 wherein the D5 formatting procedure comprises using as the most significant bits of said result mantissa the bits comprising bits N–1 through 2 of said input from the normalizer circuit, where N is the number of bits comprising said from the normalizer circuit and the number of bits comprising said result mantissa, wherein said result mantissa further comprises as its two least significant bits one of the following binary values: "01", "01" or "11".

6. A system that formats the result mantissa of an ANSI/IEEE 754-1985 floating point arithmetic operation, comprising:
   an input from the rounder circuit;
   an input from the normalizer circuit;
   an input from the select control circuit; and
   a multiplexer that couples to said input from the select control circuit, said input from the normalizer circuit, and said input from the rounder circuit, said multiplexer generates a result mantissa for a floating point arithmetic operation using a formatting procedure selected from the following group: D1, D3, D4, and D5.

7. The system of claim 6 wherein the D1 formatting procedure comprises using as the most significant bits of said result mantissa the bits comprising bits N–2 through 0 of said input from the rounder circuit, where N is the number of bits comprising said input from the rounder circuit and the number of bits comprising said result mantissa, and wherein said result mantissa further comprises a binary "0" in its least significant bit.

8. The system of claim 6 wherein the D3 formatting procedure comprises using as the most significant bits of said result mantissa the bits comprising bits N–1 through 1 of said input from the normalizer circuit, where N is the number of bits comprising said input from the normalizer circuit and the number of bits comprising said result mantissa, wherein said result mantissa further comprises a binary "1" in its least significant bit.

9. The system of claim 6 wherein the D4 formatting procedure comprises using as the most significant bits of said result mantissa the bits comprising bits N–3 through 0 of said input from the rounder circuit, where N is the number of bits comprising said input from the rounder circuit and the number of bits comprising said result mantissa, and wherein said result mantissa further comprises a binary "00" in its two least significant bits.

10. The system of claim 6 wherein the D5 formatting procedure comprises using as the most significant bits of said result mantissa the bits comprising bits N–1 through 2 of said input from the normalizer circuit, where N is the number of bits comprising said input from the normalizer circuit and the number of bits comprising said result mantissa, wherein said result mantissa further comprises as its two least significant bits one of the following binary values: "01", "10" or "11".

11. A method that formats the result mantissa of an ANSI/IEEE 754-1985 floating point arithmetic operation, comprising:
   receiving an input from the rounder circuit;
   receiving an input from the normalizer circuit;
   receiving an input from the select control circuit; and
   generating a result mantissa for a floating point arithmetic operation using a formatting procedure selected from the following group: D1, D3, D4, and D5 wherein each said formatting procedure uses said input from the select control circuit and one or more of the following inputs: said input from the rounder circuit, and said input from the normalizer circuit.

12. The method of claim 11 wherein the D1 formatting procedure further comprises defining the most significant N–1 bits of said result mantissa to be identical to the least significant N–1 bits of said input from the rounder circuit, where N is the number of bits comprising said input from the rounder circuit and the number of bits comprising said result mantissa, and defining the least significant bit of said result mantissa to be "0".

13. The method of claim 11 wherein the D3 formatting procedure further comprises defining the most significant N–1 bits of said result mantissa to be identical to the most significant N–1 bits of said input from the normalizer circuit, where N is the number of bits comprising said input from the normalizer circuit and the number of bits comprising said result mantissa, and defining the least significant bit of said result mantissa to be a "1".

14. The method of claim 11 wherein the D4 formatting procedure further comprises defining the most significant N−2 bits of said result mantissa to be identical to the least significant N−2 bits of said input from the rounder circuit, where N is the number of bits comprising said input from the rounder circuit and the number of bits comprising said result mantissa, and defining the two least significant bits of said result mantissa to be "00".

15. The method of claim 11 wherein the D5 formatting procedure further comprises defining the most significant N−2 bits of said result mantissa to be identical to the most significant N−2 bits of said input from the normalizer circuit, where N is the number of bits comprising said input from the normalizer circuit and the number of bits comprising said result mantissa, and defining the two least significant bits of said result mantissa to be one of the following: "01", "10", or "11".

16. A method to manufacture a format control circuit that formats the result mantissa of an ANSI/IEEE 754-1985 floating point arithmetic operation, comprising:

providing an input from the rounder circuit;

providing an input from the normalizer circuit;

providing an input from the select control circuit; and coupling a multiplexer to said input from the rounder circuit, to said input from the normalizer circuit, and to said input from the select control circuit, said multiplexer generates a result mantissa for a floating point arithmetic operation using a formatting procedure selected from the following group: D1, D3, D4, and D5.

17. The method of claim 16 wherein the D1 formatting procedure further comprises defining the most significant N−1 bits of said result mantissa to be identical to the least significant N−1 bits of said input from the rounder circuit, where N is the number of bits comprising said input from the rounder circuit and the number of bits comprising said result mantissa, and defining the least significant bit of said result mantissa to be a "0".

18. The method of claim 16 wherein the D3 formatting procedure further comprises defining the most significant N−1 bits of said result mantissa to be identical to the most significant N−1 bits of said input from the normalizer circuit, where N is the number of bits comprising said input from the normalizer circuit and the number of bits comprising said result mantissa, and defining the least significant bit of said result mantissa to be a "1".

19. The method of claim 16 wherein the D4 formatting procedure further comprises defining the most significant N−2 bits of said result mantissa to be identical to the least significant N−2 bits of said input from the rounder circuit, where N is the number of bits comprising said input from the rounder circuit and the number of bits comprising said result mantissa, and defining the two least significant bits of said result mantissa to be "00".

20. The method of claim 16 wherein the D5 formatting procedure further comprises defining the most significant N−2 bits of said result mantissa to be identical to the most significant N−2 bits of said input from the normalizer circuit, where N is the number of bits comprising said input from the normalizer circuit and the number of bits comprising said result mantissa, and defining the two least significant bits of said result mantissa to be one of the following: "01", "10", or "11".

* * * * *